United States Patent [19]

Bacon

[11] Patent Number: 5,775,858
[45] Date of Patent: Jul. 7, 1998

[54] STORAGE ASSEMBLY FOR LOADING AND TRANSPORTING VEHICLES IN A CONTAINER

[75] Inventor: Dwight G. Bacon, Callahan, Fla.

[73] Assignee: Vehicle Transport, Inc., Jacksonville, Fla.

[21] Appl. No.: 565,816

[22] Filed: Dec. 1, 1995

[51] Int. Cl.$^6$ ................................................ B60P 3/08
[52] U.S. Cl. ........................ 410/26; 410/13; 410/24; 410/30
[58] Field of Search ................... 410/4, 24, 13, 410/26, 29, 15, 10, 11, 23, 30, 9; 414/498, 228, 229; 220/1.5; 24/115 K, 68 CD, 265 CD; 248/499; 188/32, 4 R; 211/13, 190, 191, 175, 162

[56] References Cited

U.S. PATENT DOCUMENTS

| | | | |
|---|---|---|---|
| 2,066,714 | 1/1937 | Butterworth | 410/26 |
| 4,049,229 | 9/1977 | Peisner | 410/11 |
| 5,110,242 | 5/1992 | Chance | 220/1.5 X |
| 5,145,304 | 9/1992 | Rosen | 414/228 |
| 5,213,458 | 5/1993 | Preller et al. | 410/26 |
| 5,286,149 | 2/1994 | Seay et al. | 410/26 |
| 5,344,266 | 9/1994 | Kolb | 410/26 |
| 5,427,485 | 6/1995 | Henderson et al. | 410/26 |
| 5,454,672 | 10/1995 | Halpin et al. | 410/26 |

*Primary Examiner*—Stephen Gordon
*Attorney, Agent, or Firm*—Arthur G. Yeager

[57] ABSTRACT

A vehicle storage carriage includes a pair of upper and lower rails connected via side-mounted cross members for stability and four vertical posts, two in front, two in rear, that can be rigidly bolted to the floor of a standard cargo container. A pair of ramps with recessed wheel channels adapted to carry the rear tires of a stowed vehicle are mounted horizontally front and rear between a pair of the vertical posts. The front and rear of the ramps can be adjusted by selectively raising and lowering the cross members. The rear of the ramps are pivotably mounted to the rear cross member. Chock assemblies that are rigidly mountable to the container floor include slideably movable chocks that are movable forwardly or rearwardly and also movable sideways to accommodate different size vehicles. A pivotable strap securing plate is pivotably mounted to the container floor for use with vehicle tie-down straps for each of the stowed vehicles. Several carriages may be employed with a given standard cargo container.

20 Claims, 4 Drawing Sheets

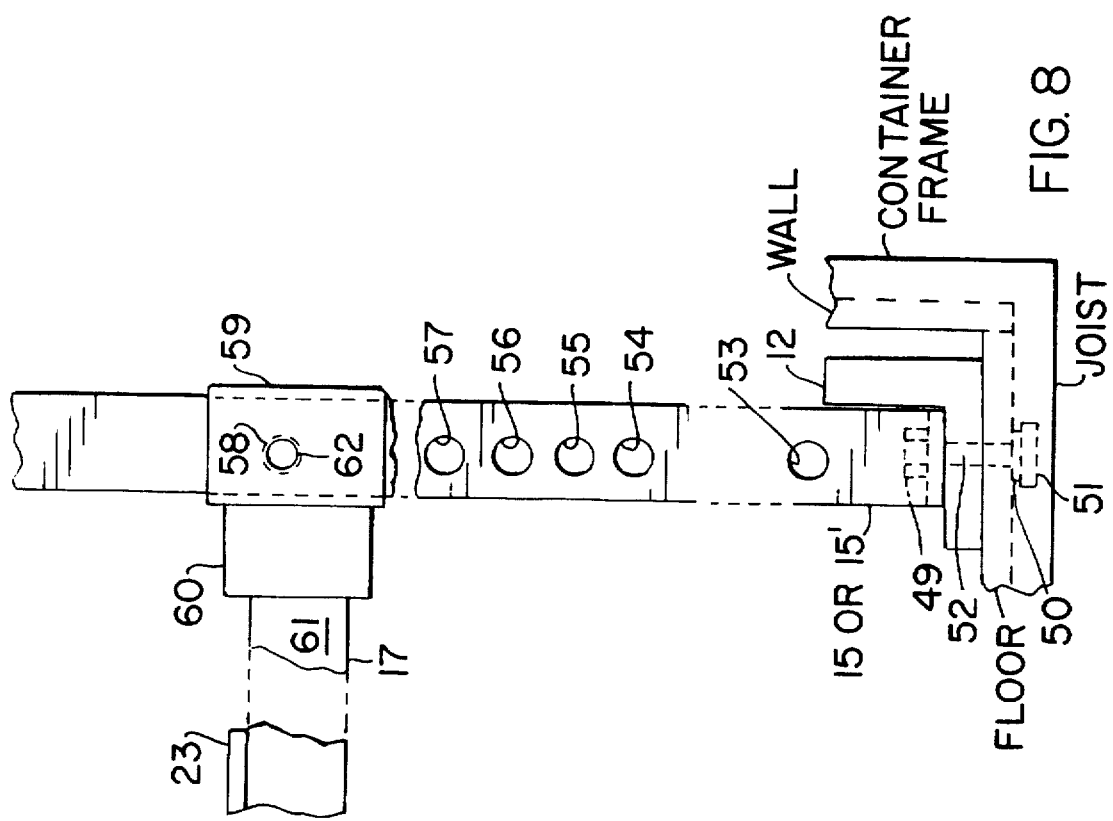
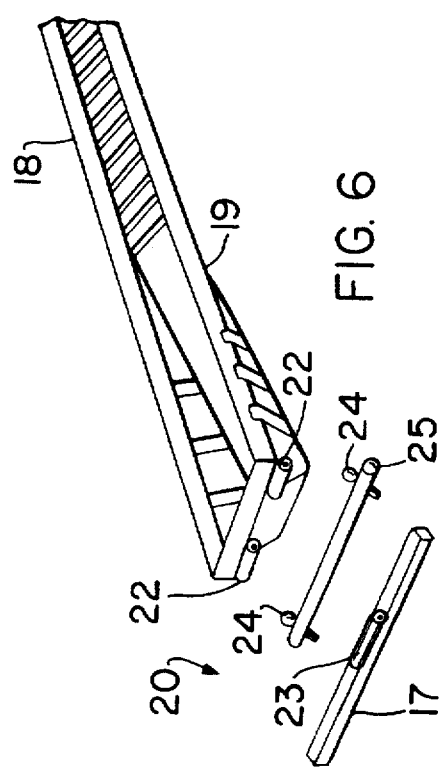
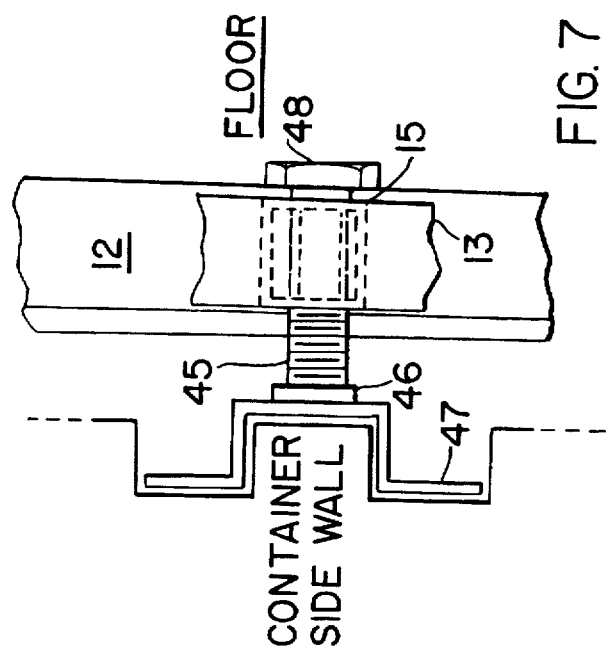

STORAGE ASSEMBLY FOR LOADING AND TRANSPORTING VEHICLES IN A CONTAINER

BACKGROUND OF THE INVENTION

1. Field of the Invention

The present invention relates to stowage systems and methods for carrying vehicles in a container.

2. Prior Art

Several systems have been developed to transport vehicles in containers. Many systems are expensive and inefficient because they require auxiliary power units for electric, pneumatic, hydraulic, or forklift vehicle-handling apparatus.

The prior systems include U.S. Pat. No. 5,110,242. This system does not provide for the capability to stow four vehicles with an overall height of 55.5 inches without the risk of roof damage (See FIG. 2 therein).

Other systems include U.S. Pat. No. 5,344,266. This system does not allow for the stowage of four vehicles of length over 192 inches or height over 54 inches. Moreover, this system cannot accommodate vans and trucks with heights of 70–81 inches without the need for significant rearrangement of the vehicle-supporting apparatus because of the horizontal cross-members and the associated vertical supports. Finally, the system does not provide for adjustable vehicle-securing points between the securing system and the container floor. This capability is needed because of variable width and length of the vehicles to be stowed therein.

SUMMARY OF THE INVENTION

In one aspect of the present invention, there is provided an adjustable storage apparatus for loading and transporting vehicles in a substantially rectangular container having a roof, a floor, two elongate side walls, an end wall and a door at the opposite end. A frame is mounted in the container having a front end and a rear end, the frame including two pairs of spaced vertical post members, wherein one pair is at the front end of the frame and another pair is at the rear end of the frame, each post having an upper end portion and a lower end portion. A front and rear horizontal cross member each having opposite end portions is included and, first means for mounting the front cross member horizontally between the posts at the front end of the frame, second means for mounting the rear cross member horizontally between the posts at the rear end of the frame, ramp means having a freely movable front end portion and a rear end portion, and pivotal securing means for securing the rear end portion of the ramp means to the rear cross member. Other aspects of the invention are seen wherein the ramp means includes a pair of spaced apart elongate ramp members having a front end and rear end members, the pivotal securing means including a pair of hinges for attaching each rear end of the ramp member to the rear cross member. The ramp member also includes a channel portion at the rear end thereof for carrying a wheel of a vehicle therein, the channel being angled downwardly with respect to the remainder of the ramp member and adjacent respective hinge.

In other aspects the first and second means includes a pair of spaced mounting means for selectively locating each cross member independently to respective posts at a plurality of selectable heights above the floor of a container and frame securing means for removably attaching the frame to a floor of a container. The frame securing means includes a pair of elongate metal rail members, first means for spacedly securing the rail members to a floor of a container, each rail member being adjacent a side wall, second means for securing the frame to the rails. The ramp members are elongate sufficiently in length to provide that the front end of the ramp member rests upon and extends forwardly of the front cross member when respective rear end is attached to the rear cross member.

The apparatus also includes vehicle securing means for securing a vehicle to a floor of a container in which a plate is secured to a floor of a container and a plurality of strap means are adapted to be attached to a vehicle and the plate, the plate including a plurality of holes for attachment of respective strap means. The plate includes a pair of elongate metal members and a pivot means, the pivot means being attached to both the metal members, a means for securing the plate includes a plurality of threaded bolts and nuts for fastening one member to a floor of a container with the nuts being below a floor and the head of a bolt being above one member. The vehicle securing means includes a chock assembly for inhibiting the movement of a vehicle stored on the floor of container within the space defined by the vertical posts of the frame, the chock assembly including a first bar having a mounting plate member at each portion thereof, the mounting plate member having holes therethrough for affixing the first bar to a floor of a container, bracket means slideably mounted on the first bar, first means for securing the bracket into one of a plurality of positions along the bar, and a pair of chock bars mounted to the bracket means and extending outward perpendicularly to the first bar, each said chock bar having a wheel chock slideably mounted on the bar, and second means for securing each chock into one of a plurality of positions along respective bar.

The storage apparatus has a frame which is sized to accommodate two vehicles, one vehicle being stored within the space defined by the vertical posts of the frame, the other vehicle being stored on the ramp, each vehicle being up to 192 inches in length and up to 56 inches in height. Also a vehicle placed within the space defined by the vertical posts of the frame of a height up to 81 inches can be stored without the disassembly of the apparatus. A plurality of additional frames can be used in a larger standard cargo container which can accommodate either two or three frames, thus holding for or six vehicles therein.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 6 is a partial view of the vehicle ramp of the present invention;

FIG. 7 is a top diagrammatic view of the jack screw support of the present invention;

FIG. 8 is a elevational diagrammatic view of a vertical post of the present invention;

DETAILED DESCRIPTION OF THE PREFERRED EMBODIMENT

Figure 1:
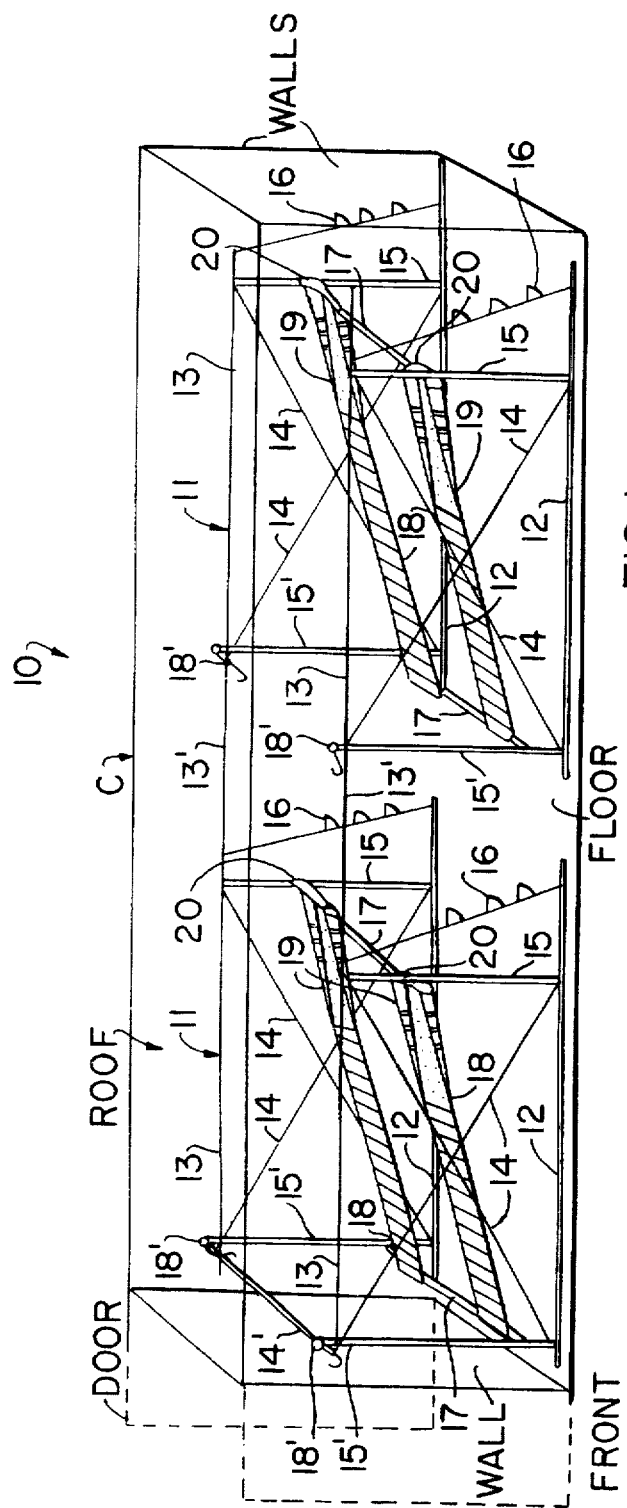
FIG. 1 is a pictorial diagram of the carriage rack assemblies of the present invention positioned within a cargo container.

Referring now to the drawings, a pictorial diagram of the present invention is illustrated at 10 in FIG. 1. Two carriage rack assemblies 11 are shown as they would be mounted in a cargo container C that is shown in outline form. The container C is standard in design and size and as illustrated is 40 feet long, 9.5 feet high, and 8 feet wide. As understood in the art, the container C has two walls, front doors, a roof, a floor section utilizing a metal frame and interior wooden floor planks, and an end wall.

The carriage rack assembly 11 includes a pair of spaced apart lower metal rails 12 bolted to the floor of the container C and a pair of upper metal members 13 with two pair of cross members 14 that provide most of the assembly frame. An optional forward cross member 14' can be installed after vehicles are stowed in the assembly 11. The assembly frame is completed by two pairs of vertical posts, 15, located rearwardly, and 15', located forwardly. The principal distinction between posts 15 and 15' is that posts 15 have holes or slots that, as will be explained are spaced at different heights to provide for mounting a pair of ramps 18. A cross member 17 is rigidly mounted forwardly between posts 15' and another cross member 17 is rigidly mounted rearwardly between posts 15. For ease of operator movement and additional strength, a pair of small ladders 16 are optionally mounted between members 12 and 13. See also FIGS. 2–3.

A pair of aluminum ramps 18 are mounted between the respective cross members 17 on respective hinges 20. Each ramp 18 includes a rearwardly located ramp channel 19 (FIG. 6) having a rear hinge 20 that includes a pair of hollow members 22 welded to the ramp 18. A tubular member 23 is welded to a respective cross member 17. Member 23 fits between members 22. Connecting rod or post 25 fits through members 22, 23 and is held into place via two removable pins 24 all as understood in the art. The front of the ramps 18 rest on the forward cross member 17.

Preferably the pair of ramps 18 are mounted on cross members 17 to be offset from center to allow more room on one side of a vehicle, near the driver's door, to allow a driver to exit a vehicle as will be more fully described hereinbelow.

Figure 4:
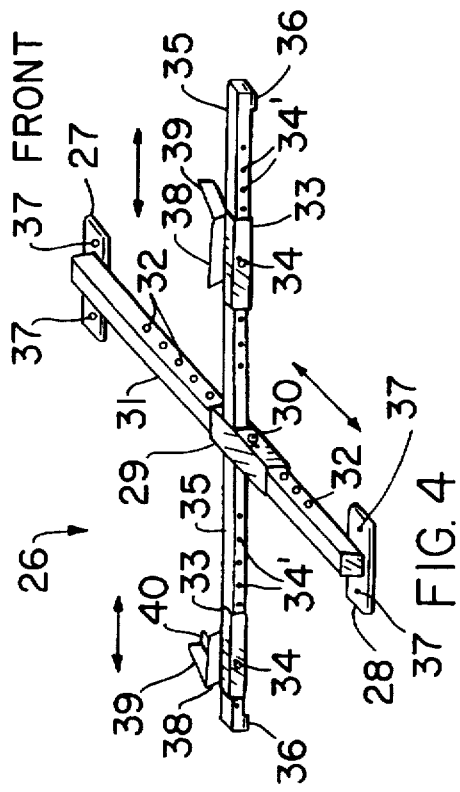
FIG. 4 is a perspective view of the wheel chock assembly of the present invention.

With reference now to FIG. 4, the wheel chock assembly 26 for use with vehicles stowed on the container floor is illustrated. Assembly 26 includes a front and rear mounting plate 27, 28 respectively having bolt holes 37 to rigidly affix the assembly to the floor of the container C. Hub (or bracket) 29 is slideably mounted on a first bar 31 and is held in position via removable pin 30 placed in a selectable hole 32. Mounted to hub 29 are two lateral adjusting bars 35 that are identical. Each bar 35 includes a base guide 36 that rests against the floor of the container thereby providing more stability for assembly 26. Each bar 35 also includes a movable chock 33 having a back plate 38, side plate 39, floor plate 40, and a series of holes or slots 34 that accept a pin 34' for selectively positioning a chock 33 laterally across the width of a container C. The bars 35 are moved forwardly or rearwardly to a desired position for a given vehicle and the chocks are then adjusted laterally to place back plate against the rear of a vehicle tire and side plate 39 laterally outside the tire (adjacent a container side wall) when a vehicle wheel is positioned on plate 40. Screws (and alternatively, bolts) are used to position the entire assembly for given vehicles in a given container C and secure it rigidly into place.

Figure 5:
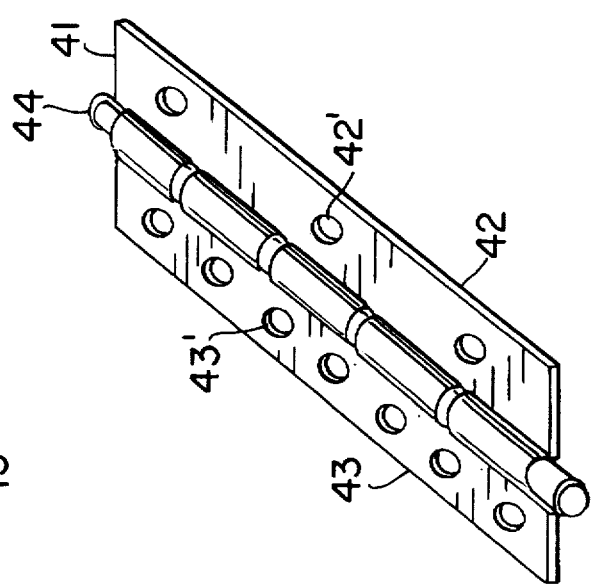
FIG. 5 is a perspective view of the pivotable strap assembly of the present invention.

FIG. 5 illustrates a pivotable strap plate 41 used to connect vehicle hold down straps 41' to the floor of the container C. As understood in the art, vehicles have a variety of slots, holes, and other apparatus included in the vehicle frame for tie-down securing, towing, and other procedures as may be desired in the circumstances. Unlike the prior art, the pivotable strap plate 41 has the capability to lay flat if part of the container C is used to carry ordinary freight that rests on the floor. Holes 42' are used with screws to secure the plate member 42 to the container frame. Strap holes 43' are used as securing points for tie-down straps 41' on plate member 43 that is movable upright on pivot pin 44. When not in use, member 43 can lay flat on the floor so as to not interfere with pallets or other freight resting on the floor.

FIG. 7 illustrates a jack screw 45 that has a plate 46 that is attached to a wall engagement plate 47 that is forced against the container side walls by rotation of screw head 48. Plate 47 engages the framing of the wall to assist with overall stability of the carriage rack assembly. The screw is mounted near the top of a rear vertical post 15. Preferably, plate 47 is coated with a surface that does not mar the container wall.

FIG. 8 illustrates the general layout of a vertical post 15 or 15'. Each post is mounted via bolt 49 with shaft 52 extending through the floor and having washer 50 secured via nut 51. Holes for securing a respective cross member 17 are spaced to have a lower hole 53 at a height of about 15 inches. For forward posts 15' holes 54, 55, 56, 57 and 58 are at respective heights of 58 inches, 60 inches, 62 inches, 64 inches and 79 inches. For a rear post 15, the slots are respectively at 30 inches, 32 inches, 34 inches, 36 inches and 79 inches to lower the forward edge of a ramp 18. The height and pattern of the holes 53–58 are adapted to accommodate the widest variety of vehicles currently in use. Each storage apparatus 11 includes vertical post members 15 and 15' that are sized to accommodate two vehicles V1 and V2 each having a height of 56 inches as well as a single vehicle V5 of a height of up to 81 inches without disassembly of apparatus 11. Each storage apparatus 11 is also sized to accommodate two vehicles each of which is up to 192 inches in length. Bracket 59 has a sleeve 60 to accommodate cross member sleeve 61 that is mounted therein. Pins 62 are used to secure the cross members 17 at the desired height via holes 53–58. In a stored position the front end of a ramp 18 is held upward and horizontally by a chained hook 18' attached to the posts 15'. This provides for movement and positioning of a cross member 17 without accompanying movement of the respective ramp 18. As understood in the art, a wide variety of means could be used in place of chained hook 18' to support the ramp 18.

Figure 2:
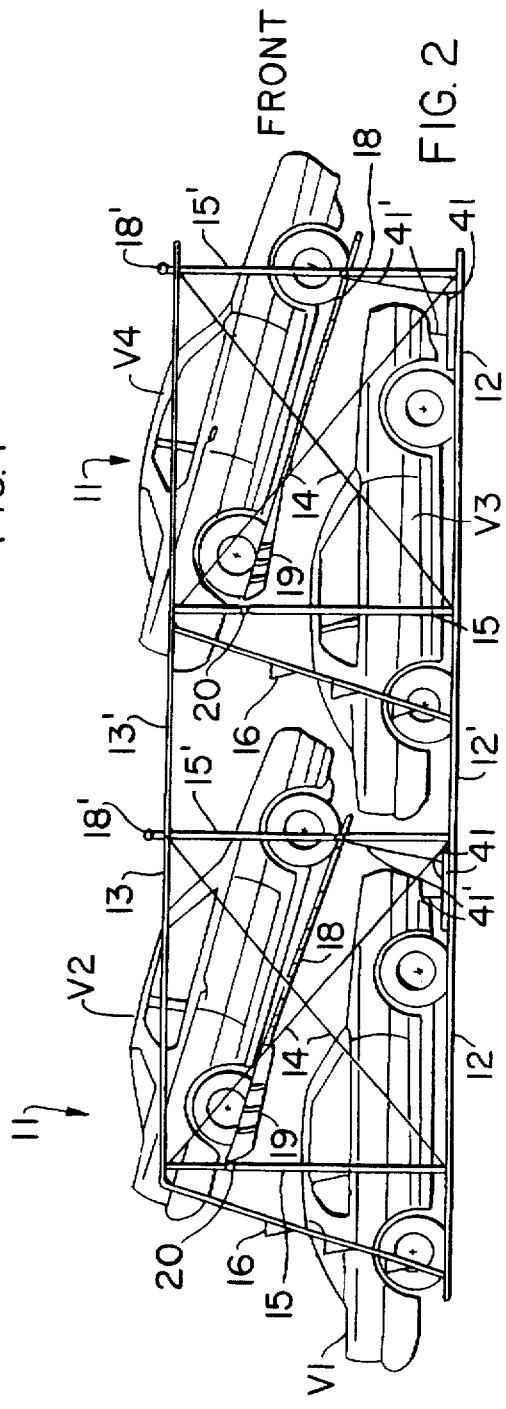
FIGS. 2–3 are pictorial views of the invention illustrating the stowage of vehicles therein.

With regard to FIG. 2, the vehicle loading and stowage means can be described. After installation of the carriage rack assembly 11 in the rear of the container C, a first vehicle, V1, is backed into the container C and is secured by positioning the chock assembly 26 to place chocks 33 against the rear and outside of the rear tires. The pivotable strap plate 41 is used for tie down of the front end of vehicle V1. The ramps 18 are moved to accommodate vehicle V1 and the second vehicle V2 that will next be loaded.

Auxiliary ramps are moved into place to provide that vehicle V2 can be backed upward onto ramps 18 to position the rear wheels thereof into ramp channels 19. Tie-down straps 41' are connected between the strap plate 41 and the vehicle V2 as desired in the circumstances. (Plate 41 extends forwardly a sufficient length to provide tie-down points for two vehicles).

FIG. 2 also illustrates the placement of a second carriage rack assembly with two vehicles V3 and V4 stowed thereon as described hereinabove. (Bars 12' and 13' represent either existing extensions of members 12 and 13 or a separate connecting group of rails to connect assemblies 11 to assist in spacing and stability to accommodate different container lengths.) In longer containers three assemblies 11 can be used if so desired.

Figure 3:
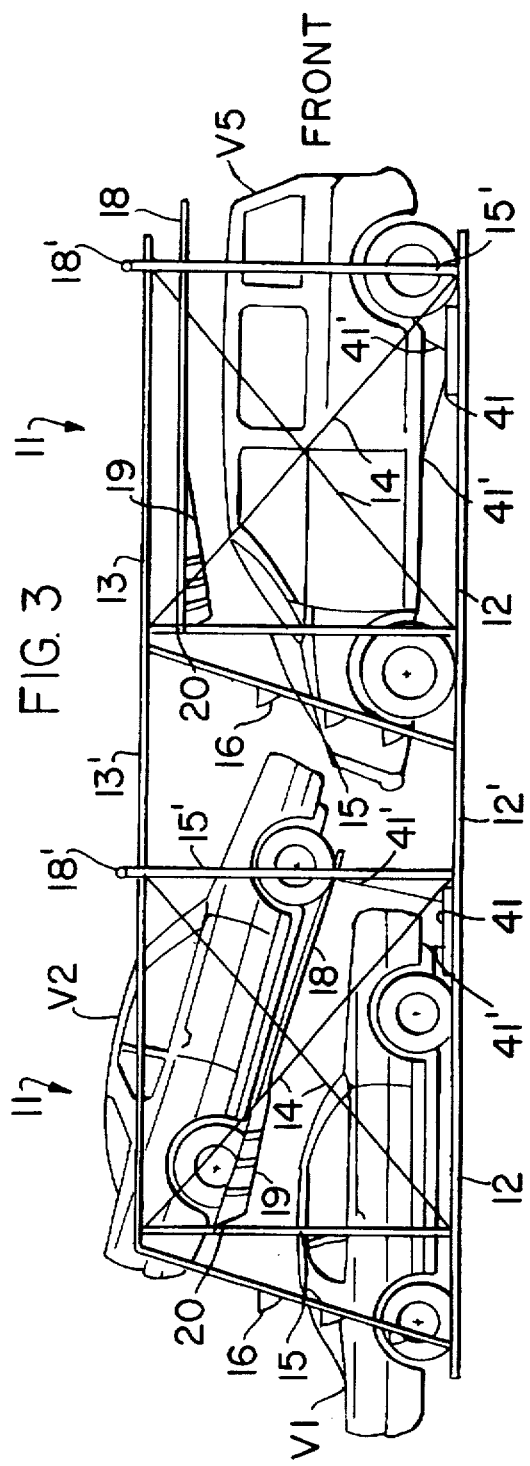

FIG. 3 illustrates a unique feature of the present invention. The rearward assembly 11 is installed and loaded as described with respect to FIG. 2. The forward assembly 11 has ramps 18 stowed horizontally to provide clearance for truck V5. It is a principal advantage of the present invention that no structural change is needed to accommodate vehicle V5 within the assembly. Vehicle V5 can be tied down as described hereinabove. Preferably, vehicles are backed into the respective assembly 11 to allow for ease of disconnecting the battery in each of the vehicles (to minimize the fire hazard). Of course, the battery in the first vehicle is disconnected prior to loading another vehicles on the ramps above same.

Figure 9:
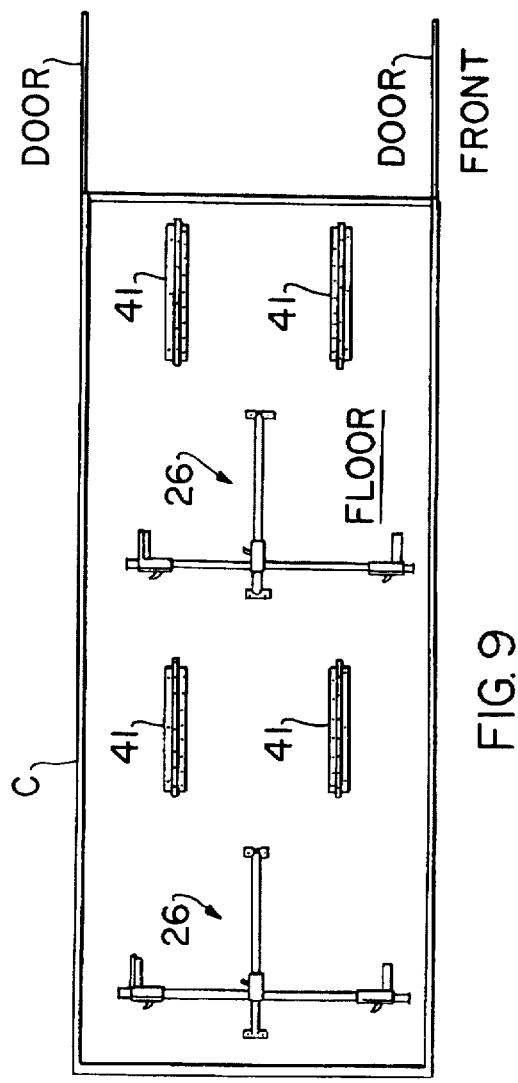
FIG. 9 is a plan view of a container illustrating a representative layout of the vehicle securing apparatus of two assemblies.

FIG. 9 is a top plan view illustrating a representative layout of two chock assemblies 26 and four strap securing means 41 as affixed to the floor of a container. The exact placement depends upon the size of the container. Note that chock assemblies 26 are offset so as to provide room for a driver of a vehicle to exit to his left (looking forward) once a car is backed into position.

Figure 10:
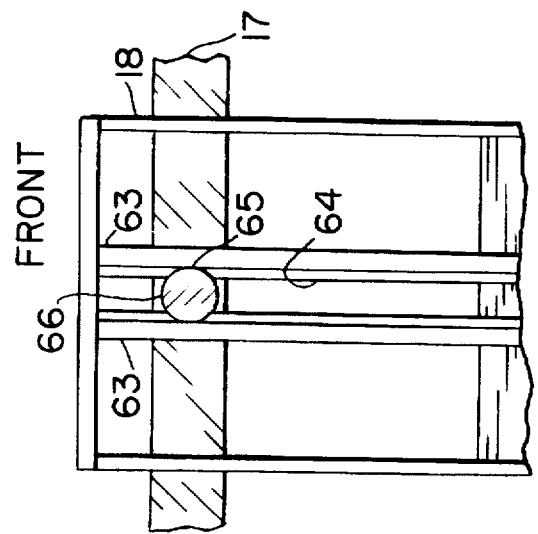
FIG. 10 is a partial plan view of the front end of a ramp illustrating a preferred securing method.

FIG. 10 illustrates the preferred method of inhibiting lateral movement of a ramp 18. At the front end of the ramp 18 and connecting to the rungs of the ramp 18 are two spaced channel members 63 that have upright portions defining a channel 64 therebetween. A pin 65 rests in a hole 66 in the forward cross member 17. Channel 64 is approximately 15 inches long and is sized to accommodate the changes in position of a hinged ramp 18 on the vertically movable cross member 17 as understood in the art. Pin 65 is sized to prevent lateral movement of the ramp 18 that might result, for example from the tension placed on tie-down straps 41'.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An adjustable storage apparatus for loading and transporting vehicles in a substantially rectangular container having a roof, a floor, two elongate side walls, an end wall and a door comprising a frame having a front end and a rear end, said frame including two pairs of spaced vertical post members, one said pair being at said front end of said frame and another said pair being at said rear end of said frame, each said post member having an upper end portion and a lower end portion, a front and rear horizontal cross member each having opposite end portions, first means for mounting said front cross member horizontally between said post members at said front end of said frame, second means for mounting said rear cross member horizontally between said post members at said rear end of said frame, ramp means having a freely movably front end portion and a rear end portion, pivotal securing means affixed between said rear end portion of said ramp means and said rear cross member for securing said rear end portion of said ramp means to said rear cross member and further including a chock assembly for inhibiting the movement of a vehicle stored on the floor of the container within the space defined by said vertical post members of said frame, said chock assembly including a first bar having a mounting plate member at each end portion thereof, each said mounting plate member having holes therethrough for affixing said first bar to a floor of a container, bracket means slideably mounted on said first bar, first means for securing said bracket means into one of a plurality of positions along said bar, a pair of chock bars mounted to said bracket means and extending outward perpendicularly to said first bar, each said chock bar having a wheel chock slideably mounted on said chock bar, second means for securing each said chock into one of a plurality of positions along a respective said chock bar.

2. The storage apparatus as defined in claim 4 wherein said ramp means includes a pair of spaced apart elongate ramp members having front end and rear end members, said pivotal securing means including a pair of hinges for attaching each said rear end member of said ramp member to said rear cross member.

3. The storage apparatus as defined in claim 2 wherein each said ramp member includes a channel portion at said rear end member thereof for carrying a wheel of a vehicle therein, said channel portion being located adjacent a respective said hinge and being angled downwardly with respect to the remaining portion of said ramp member.

4. The storage apparatus as defined in claim 3 wherein each of said first and second means for mounting include a pair of spaced mounting means for selectively locating each said cross member independently to respective said post members at a plurality of selectable heights above the floor of a container.

5. The storage apparatus as defined in claim 1 further including frame securing means for removably attaching said frame to a floor of a container.

6. The storage apparatus as defined in claim 5 wherein said frame securing means includes a pair of elongate metal rail members, first means for spacedly securing said rail members to a floor of a container, said rail members being positionable adjacent respective side walls of a container, second means for securing said frame to said rail members, one of said post members of each said pair of post members being affixed to a respective one of said rail members.

7. The storage apparatus as defined in claim 2 wherein said ramp members are elongate sufficiently in length to provide that said front end member of each said ramp member rests upon and extends forwardly of said front cross member when the respective rear end member is attached to said rear cross member, pin means for connecting said front end member of each said ramp member to said front cross member to inhibit lateral movement thereof.

8. The storage apparatus as defined in claim 1 further including vehicle securing means for securing a vehicle to a floor of a container.

9. The storage apparatus as defined in claim 8 wherein said vehicle securing means includes a plate and means for securing said plate to a floor of a container and a plurality of strap means adapted to be attached to a vehicle and said plate, said plate including a plurality of holes for attachment of respective said strap means.

10. The storage apparatus of claim 1 wherein each said chock includes a generally upright first plate member for engaging the tread of a vehicle tire, a generally upright second plate member perpendicular to said first plate member for engaging the side wall of a vehicle tire, and a third plate member resting on the floor of a container for resting a vehicle tire thereon.

11. An adjustable storage apparatus for loading and transporting vehicles in a substantially rectangular container having a roof, a floor, two elongate side walls, an end wall and a door comprising a frame having a front end and a rear end, said frame including two pairs of spaced vertical post members, one said pair being at said front end of said frame and another said pair being at said rear end of said frame, each said post member having an upper end portion and a lower end portion, a front and rear horizontal cross member each having opposite end portions, first means for mounting said front cross member horizontally between said post members at said front end of said frame, second means for mounting said rear cross member horizontally between said post members at said rear end of said frame, ramp means having a freely movably front end portion and a rear end portion, pivotal securing means for securing said rear end portion of said ramp means to said rear cross member, and further including vehicle securing means for securing a vehicle to a floor of a container, said vehicle securing means includes a plate and means for securing said plate to a floor of a container and a plurality of strap means adapted to be attached to a vehicle and said plate, said plate including a plurality of holes for attachment of respective said strap means, said plate including a pair of elongate metal members and a pivot means, said pivot means attached to both said metal members, said means for securing including a plurality of threaded bolts and nuts for fastening one said metal member to a floor of a container.

12. An adjustable storage apparatus for loading and transporting vehicles in a substantially rectangular container having a roof, a floor, two elongate side walls, an end wall and a door comprising a frame having a front end and a rear end, said frame including two pairs of spaced vertical post members, one said pair being at said front end of said frame and another said pair being at said rear end of said frame, each said post member having an upper end portion and a lower end portion, a front and rear horizontal cross member each having opposite end portions, first means for mounting said front cross member horizontally between said post members at said front end of said frame, second means for mounting said rear cross member horizontally between said post members at said rear end of said frame, ramp means having a freely movably front end portion and a rear end portion, pivotal securing means for securing said rear end portion of said ramp means to said rear cross member, and further including a chock assembly for inhibiting the movement of a vehicle stored on the floor of the container within the space defined by said vertical post members of said frame, said chock assembly including a first bar having a mounting plate member at each end portion thereof, each said mounting plate member having holes therethrough for affixing said first bar to a floor of a container, bracket means slideably mounted on said first bar, first means for securing said bracket means into one of a plurality of positions along said bar, a pair of chock bars mounted to said bracket means and extending outward perpendicularly to said first bar, each said chock bar having a wheel chock slideably mounted on said chock bar, second means for securing each said chock into one of a plurality of positions along a respective said chock bar.

13. The storage apparatus of claim 12 wherein said vertical post members, said cross members, said means for mounting said cross members, and said ramp means are sized to accommodate two vehicles, one said vehicle being stored within the space defined by said vertical post members of said frame, the other said vehicle being stored on said ramp means, each said vehicle being up to 192 inches in length and up to 56 inches in height.

14. The storage apparatus of claim 12 wherein said vertical post members, said cross members, said means for mounting said cross members, and said ramp means are sized to accommodate a vehicle within the space defined by said vertical post members of said frame of a height up to 81 inches without the disassembly of said apparatus.

15. The storage apparatus of claim 12 wherein each said chock includes a generally upright first plate member for engaging the tread of a vehicle tire, a generally upright second plate member perpendicular to said first plate member for engaging the side wall of a vehicle tire, and a third plate member resting on the floor of a container for resting a vehicle tire thereon.

16. The storage apparatus as defined in claim 12 wherein said ramp means includes a pair of spaced apart elongate ramp members having front end and rear end members, said pivotal securing means including a pair of hinges for attaching each said rear end member of said ramp member to said rear cross member.

17. The storage apparatus as defined in claim 16 wherein said ramp members are elongate sufficiently in length to provide that said front end member of each said ramp member rests upon and extends forwardly of said front cross member when respective said rear end member removable pin are attached to said rear cross member, pin means for connecting said front end member of each said ramp member to said front cross member to inhibit lateral movement thereof.

18. An adjustable storage apparatus for loading and transporting vehicles in a substantially rectangular container having a roof, a floor, two elongate side walls, an end wall and a door comprising a frame having a front end and a rear end, said frame including two pairs of spaced vertical post members, one said pair being at said front end of said frame and another said pair being at said rear end of said frame, each said post member having an upper end portion and a lower end portion, a front and rear horizontal cross member each having opposite end positions, first means for mounting said front cross member horizontally between said post members at said front end of said frame, second means for mounting said rear cross member horizontally between said post members at said rear end of said frame, ramp means having a freely movable front end portion and a rear end portion, pivotal securing means affixed between said rear end portion of said ramp means and said rear cross member for securing said rear end portion of said ramp means to said rear cross member, said ramp means including a pair of spaced apart elongate ramp members having a front end and a rear end, said pivotal securing means including a pair of hinges for attaching each said rear end of said ramp member to said rear cross member, each said ramp member includes a channel at said rear end thereof for carrying a wheel of a vehicle therein, said channel being located adjacent a respective said hinge, a chock assembly for inhibiting the movement of a vehicle stored on the floor of a container within the space defined by said vertical post members of said frame, said chock assembly including a first bar having a mounting plate member at each end portion thereof, each said mounting plate member having holes therethrough for affixing said first bar to a floor of a container, bracket means slideably mounted on said first bar, first means for securing said bracket means into one of a plurality of positions along said bar, a pair of chock bars mounted to said bracket means and extending outward perpendicularly to said first bar, each said chock bar having a wheel chock slideably mounted on said chock bar, second means for securing each said chock into one of a plurality of positions along a respective said chock bar.

19. The storage apparatus as defined in claim 18 wherein each of said first and second means for mounting includes a pair of spaced mounting means for selectively mounting each said cross member independently to respective said post members at a plurality of selectable heights above the floor of a container.

20. An adjustable storage apparatus for loading and transporting vehicles in a substantially rectangular container having a roof, a floor, two elongate side walls, an end wall and a door comprising a frame having a front end and a rear end, said frame including two pairs of spaced vertical post members, one said pair being at said front end of said frame and another said pair being at said rear end of said frame, each said post member having an upper end portion and a lower end portion, a front and rear horizontal cross member each having opposite end portions, first means for mounting said front cross member horizontally between said post members at said front end of said frame, second means for mounting said rear cross member horizontally between said post members at said rear end of said frame, ramp means having a freely movably front end portion and a rear end portion, pivotal securing means affixed between said rear end portion of said ramp means and said rear cross member for securing said rear end portion of said ramp means to said rear cross member and further including vehicle securing means for securing a vehicle to a floor of a container, said vehicle securing means including a movable plate and means for securing said plate to a floor of a container and a plurality of strap means adapted to be attached to a vehicle and said plate, said plate being movable between a verticle position and a horizontal position, said plate including a plurality of holes for attachment of respective said strap means when said plate is in said vertical position.

* * * * *